United States Patent
Shibutani et al.

(10) Patent No.: US 8,722,822 B2
(45) Date of Patent: May 13, 2014

(54) AQUEOUS EMULSION AND PRODUCTION METHOD THEREOF

(75) Inventors: Mitsuo Shibutani, Osaka (JP); Masahiro Saito, Osaka (JP); Shusaku Mandai, Osaka (JP); Takaaki Murahashi, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 523 days.

(21) Appl. No.: 12/744,598

(22) PCT Filed: Nov. 26, 2008

(86) PCT No.: PCT/JP2008/071426
§ 371 (c)(1),
(2), (4) Date: May 25, 2010

(87) PCT Pub. No.: WO2009/069644
PCT Pub. Date: Jun. 4, 2009

(65) Prior Publication Data
US 2010/0261830 A1    Oct. 14, 2010

(30) Foreign Application Priority Data
Nov. 28, 2007    (JP) ................................. 2007-306689

(51) Int. Cl.
*C08F 2/30* (2006.01)
*C08F 8/12* (2006.01)
*C08F 16/04* (2006.01)

(52) U.S. Cl.
USPC .............................. 526/202; 526/88; 526/328

(58) Field of Classification Search
USPC ....................... 524/459, 45; 526/88, 202, 328
See application file for complete search history.

(56) References Cited

U.S. PATENT DOCUMENTS

| 5,623,086 | A | 4/1997 | Perri et al. |
| 6,072,079 | A | 6/2000 | Cook |
| 7,928,166 | B2 | 4/2011 | Shibutani |
| 2006/0217484 | A1 * | 9/2006 | Tanimoto et al. ............. 524/556 |
| 2009/0023880 | A1 * | 1/2009 | Shibutani .................. 526/329.6 |

FOREIGN PATENT DOCUMENTS

| CN | 1768081 | 5/2006 |
| CN | 101001895 | 7/2007 |
| EP | 1612226 | 1/2006 |
| EP | 1958985 | 8/2008 |
| EP | 1958985 A1 * | 8/2008 |
| EP | 2189499 | 5/2010 |
| JP | 2000-297107 | 10/2000 |
| JP | 2006-095825 | 4/2006 |
| JP | 2006-124682 | 5/2006 |
| JP | 2006-316260 | 11/2006 |
| WO | 00/24702 | 5/2000 |
| WO | WO 2006018870 A1 * | 2/2006 |
| WO | 2007/060960 | 5/2007 |
| WO | WO 2007060960 A1 * | 5/2007 |
| WO | 2007/129370 | 11/2007 |

* cited by examiner

*Primary Examiner* — Kelechi Egwim
(74) *Attorney, Agent, or Firm* — Greenblum & Bernstein, P.L.C.

(57) ABSTRACT

This invention provides an aqueous emulsion, which comprises a polyvinyl alcohol-based resin, as the dispersant, and a polymer comprising a structural unit derived from an ethylenically unsaturated monomer, as the dispersoid, from which a film having excellent transparency can be obtained, and which is excellent in mechanical stability, chemical stability, freezing stability and storage stability, and a method for producing the same, and relates to an aqueous emulsion which has an average particle size of the dispersoid of from 100 to 450 μm and an apparent grafting efficiency of the polyvinyl alcohol-based resin of from 65 to 75% based on the dispersoid, and a method for producing the same.

11 Claims, No Drawings

AQUEOUS EMULSION AND PRODUCTION METHOD THEREOF

TECHNICAL FIELD

This invention relates to an aqueous emulsion which comprises, as the dispersoid, a polymer comprising a structural unit derived from an ethylenically unsaturated monomer, and a production method thereof, more illustratively, it relates to an aqueous emulsion obtained by carrying out emulsion polymerization of an ethylenically unsaturated monomer in the presence of a polyvinyl alcohol-based resin as the dispersant, which is an aqueous emulsion that shows excellent adhesiveness for wood and the like and from which a film having excellent film-forming property, chemical stability and freezing stability and having excellent transparency can be obtained, and a production method thereof.

BACKGROUND OF THE INVENTION

Up to now, a polyvinyl alcohol-based resin (polyvinyl alcohol is referred to as PVA hereinafter) has been used suitably as a dispersant in the emulsion polymerization of ethylenically unsaturated monomers.

Among such ethylenically unsaturated monomers, vinyl acetate has high affinity for PVA-based resins and can produce an aqueous emulsion having excellent stability, but since the thus obtained vinyl acetate resin emulsion has high minimum film-forming temperature, there is a problem in that film-forming property and adhesiveness become insufficient under a low temperature environment.

On the other hand, since an acrylic-based emulsion has sufficient film-forming property even under a low temperature environment, there is increasing a case in which such an acrylic-based resin emulsion is applied to applications wherein a vinyl acetate resin emulsion has been conventionally used.

However, in the case of the acrylic-based resin emulsion, emulsification dispersion property is insufficient by a general unmodified PVA-based resin and, what is more, acrylic-based monomers have smaller radical reactivity in comparison with vinyl acetate, so that there is a case in which initial reaction is difficult to be generated in the presence of a PVA-based resin or stability at the time of polymerization becomes insufficient.

In order to solve such problems in the production of acrylic-based resin emulsions, examinations are broadly carried out on the use of various modified PVA resins having further high dispersion stability, as the PVA-based resin.

For example, as a dispersant which can provide an acrylic-based resin emulsion having excellent stability at the time of emulsion polymerization and having excellent long-term standing stability, dilute stability and mechanical stability, a PVA-based resin comprising a polyoxy alkylene group in its side chain has been proposed (e.g., see Patent Reference 1).

In addition, a dispersant consisting of such a polyoxy alkylene group-containing PVA-based resin is suitably used in a polymerization method by a pre-emulsion method in which an acrylic-based monomer is emulsified and dispersed in water in the presence of a dispersant and the thus prepared pre-emulsion is polymerized by adding it dropwise to a polymerization reaction system.

In this connection, the polyoxy alkylene group-containing PVA-based resin used in the Patent Reference 1 has a degree of saponification of from 30 to 80% by mol, and those having a degree of saponification of from 35 to 73% by mol, namely those having a region of lower degree of saponification as a PVA-based resin, are used in the Examples.

In addition, as a dispersant which can provide an acrylic-based resin emulsion having excellent mechanical stability and freezing stability and also in long-term standing stability at high temperature, a PVA-based resin comprising a 1,2-diol structure in its side chain has been proposed (e.g., see Patent Reference 2).

In this connection, there is described in this Patent Reference 2 that those which have a residual ester group quantity of 15% by mol or less (those having a degree of saponification of exceeding 85% by mol) are desirable as the PVA-based resin comprising a 1,2-diol structural unit, and in the Examples, those having a residual ester group quantity of from 2.2 to 6.0% by mol (from 94.0 to 97.8% by mol as the degree of saponification), namely those having a high range of the degree of saponification, are used as the PVA-based resin.

Patent Reference 1: JP-A-2000-297107
Patent Reference 2: JP-A-2006-124682

DISCLOSURE OF THE INVENTION

Problems that the Invention is to Solve

However, when the present inventors have examined in detail on the techniques described in these patent references, it was found that the acrylic-based resin emulsion obtained in accordance with the Patent reference 1 by the pre-emulsion method using a PVA-based resin which contains a polyoxy alkylene group having low degree of saponification as the emulsification dispersant was excellent regarding its polymerization stability but insufficient in terms of its chemical stability and freezing stability and there is a room for improvement regarding the film-forming property.

In addition, the acrylic-based resin emulsion obtained in accordance with the Patent reference 2 by the dropping polymerization using a PVA-based resin which contains a 1,2-diol structure having high degree of saponification as the dispersant was excellent regarding its mechanical stability, chemical stability, freezing stability and preservation stability, but coarse particles were formed depending on the emulsion polymerization conditions and kinds of the monomer to be used in the emulsion polymerization, and its film-forming property was insufficient and it was also insufficient in terms of the transparency of the film obtained from this.

That is, the invention aims at providing an aqueous emulsion which shows excellent adhesiveness for wood and the like and from which a film having excellent film-forming property, chemical stability and freezing stability and having excellent transparency can be obtained, and a production method thereof.

Means for Solving the Problems

Taking the above-mentioned actual circumstances into consideration, the present inventors have conducted intensive studies and found as a result that the object of the invention can be achieved by the following constitution and thereby accomplished the invention.

(1) An aqueous emulsion, comprising a dispersant comprising a polyvinyl alcohol-based resin and a polymer comprising, as the dispersoid, a structural unit derived from an ethylenically unsaturated monomer, wherein an average particle size of the dispersoid is from 100 to 450 nm and an apparent grafting efficiency of the polyvinyl alcohol-based resin based on the dispersoid is from 65 to 75%.

(2) The aqueous emulsion according to the above-mentioned (1), wherein the ethylenically unsaturated monomer is an acrylic-based monomer.

That is, the invention relates to an aqueous emulsion obtained by emulsion-polymerizing an ethylenically unsaturated monomer, in which its film-forming property and transparency of the film obtained therefrom are improved by reducing particle size of the dispersoid, and, while various stabilities generally have a tendency to lower when particle size becomes small due to increase of the surface area, the lowering is controlled by the value of the apparent grafting efficiency of the PVA-based resin based on the dispersoid, namely strength of the protective colloidal ability.

(3) The aqueous emulsion of the invention can be obtained, for example, by adding a pre-emulsion dropwise to an aqueous medium to carry out emulsion polymerization, wherein the pre-emulsion is obtained by emulsifying and dispersing the ethylenically unsaturated monomer in water in the presence of the PVA-based resin which comprises a 1,2-diol structural unit represented by the following general formula (1) and has a degree of saponification of from 80 to 93% by mol.

[Chem. 1]

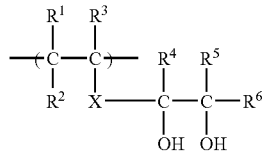

(1)

[In the formula, $R^1$, $R^2$ and $R^3$ each independently represent a hydrogen atom or an organic group, X represents a single bond or a bonding chain, and $R^4$, $R^5$ and $R^6$ each independently represent a hydrogen atom or an organic group.]

That is, a pre-emulsion in which a monomer is finely dispersed in water is able to be obtained by the use of a PVA-based resin having excellent affinity for both of the ethylenically unsaturated monomer and its polymer as the dispersant, and an aqueous emulsion of a polymer as the dispersoid having an extremely small particle size is obtained by adding this dropwise to a polymerization reaction system and thereby carrying out emulsion polymerization.

(4) The aqueous emulsion according to the above-mentioned (3), wherein a content of the 1,2-diol structural unit represented by the general formula (1) in the polyvinyl alcohol-based resin is from 2 to 15% by mol.

(5) The aqueous emulsion according to the above-mentioned (3) or (4), wherein an average degree of polymerization of the polyvinyl alcohol-based resin comprising the 1,2-diol structural unit represented by the general formula (1) is from 50 to 4,000.

(6) The aqueous emulsion according to any one of the above-mentioned (3) to (5), wherein the 1,2-diol structural unit represented by the general formula (1) is a 1,2-diol structural unit represented by the following general formula (1').

[Chem. 2]

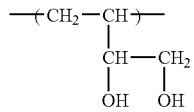

(1')

(7) The aqueous emulsion according to any one of the above-mentioned (3) to (6), wherein a content of the dispersant is from 0.1 to 100 parts by weight based on 100 parts by weight of the dispersoid.

(8) The aqueous emulsion according to any one of the above-mentioned (1) to (7), which has a solid matter concentration of from 10 to 60% by weight.

(9) The aqueous emulsion according to any one of the above-mentioned (1) to (8), which comprises a cross-linking agent.

(10) The aqueous emulsion according to the above-mentioned (9), wherein the cross-linking agent is methylolmelamine.

(11) The aqueous emulsion according to the above-mentioned (9) or (10), wherein a content of the cross-linking agent is from 0.1 to 150 parts by weight based on 100 parts by weight of the polyvinyl alcohol-based resin.

(12) A method for producing an aqueous emulsion, which comprises: obtaining a pre-emulsion by emulsifying and dispersing an ethylenically unsaturated monomer in water in the presence of a polyvinyl alcohol-based resin comprising a 1,2-diol structural unit represented by the general formula (1) and having a degree of saponification of from 80 to 93% by mol; and adding the obtained pre-emulsion dropwise to an aqueous medium to carry out emulsion polymerization.

Advantage of the Invention

Since the aqueous emulsion of the invention is excellent in film-forming property, chemical stability and freezing stability, can produce a film having excellent transparency and shows excellent adhesiveness for wood and the like, it is markedly suitable for applications such as coating agent, adhesive and sensitive adhesive to various backing materials.

BEST MODE FOR CARRYING OUT THE INVENTION

The explanation of composing elements described in the following is an example (typical example) of the embodiment of the invention and is not specified to these contents.

The following describe the invention in detail.

The aqueous emulsion of the invention comprises a PVA-based resin as the dispersant and a polymer comprising a structural unit derived from an ethylenically unsaturated monomer (to be referred simply to as "polymer of an ethylenically unsaturated monomer" hereinafter in some cases) as the dispersoid.

The dispersoid of the aqueous emulsion of the invention is a polymer of an ethylenically unsaturated monomer, and for example, there may be mentioned a polymer comprising, as the main, a structural unit derived from a vinyl ester-based monomer, a diene-based monomer, an olefin-based monomer, an acrylamide-based monomer, an acrylonitrile-based monomer, a styrene-based monomer, a vinyl ether-based monomer or an allyl-based monomer. Particularly, it is desirable to use a polymer comprising a structural unit derived from an acrylic-based monomer from the viewpoint that the effect of then invention can be obtained to the maximum.

As such an acrylic-based monomer, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, octadecyl (meth)acrylate, (meth) acrylic acid and the like can be mentioned.

In addition, though it is possible to use the above-mentioned acrylic-based monomers each independently, it is also a desirable embodiment to use two or more species by mixing them, or to use further jointly with other monomer such as a styrene-based monomer, with the aim of controlling glass transition and other characteristics of the obtained polymer.

According to the emulsion of the invention, an average particle size of the dispersoid (namely, the above-mentioned polymer) is from 100 to 450 nm, which is markedly small in comparison with general emulsions, and that of particularly from 100 to 350 nm, further from 100 to 200 nm, is preferably used. When this average particle size is too small, the viscosity becomes high in case that concentration of the emulsion is high, thus posing a tendency of lowering handling property. When too large on the contrary, there is a tendency that film-forming property of the emulsion is lowered or transparency of the obtained coating film is lowered.

In this connection, the average particle size of dispersoid of this emulsion is obtained by adding 0.1 g of the emulsion dropwise to 50 g of water and applying a supersonic wave thereto for 5 minutes to prepare highly diluted and highly dispersed samples for evaluation use, and calculating average particle size at 23° C. using "NICOMP 380" manufactured by Particle Sizing Systems by Volume-Wt NICOMP DISTRIBUTION mode.

In addition, the aqueous emulsion of the invention is not only small in average particle size but also less in coarse particles, and its amount is generally from 0 to 0.5%, particularly from 0 to 0.3% and further from 0 to 0.1%. When amount of such coarse particles is too large, it is not desirable because there is a case in which film-forming property is reduced or coating property at the time use is spoiled.

In this connection, such coarse particles mean solid matter remained on a nylon cloth when the aqueous emulsion is filtered using a 120 mesh nylon, and its amount is based on the weight of aqueous emulsion.

The aqueous emulsion of the invention has another property in which an apparent grafting efficiency of the PVA-based resin is within the range of from 65 to 75%, particularly preferably from 68 to 75%, based on the dispersoid. According to the invention, while various stabilities generally have a tendency to lower when particle size of emulsion becomes small due to increase of the surface area, it is able to lower the lowering by the size of the apparent grafting efficiency of the dispersant, PVA-based resin, based on the dispersoid, namely strength of the protective colloidal ability.

In this connection, such an apparent grafting efficiency is measured by the method described in the following.

The aqueous emulsion is coated on a PET film using an applicator for 100 μm use and dried while allowing it to stand still for 24 hours under an atmosphere of 23° C. and 50% RH, thereby preparing a film. About 1 g of this (a) is precisely weighed and soaked in methyl acetate of 50° C., hot water of 98° C., toluene of 98° C., hot water of 98° C. and methyl ethyl ketone of 50° C., respectively, each for 6 hours, and its dry weight b (g) is calculated. In addition, the volatile matter content c (%) of the film before the test is separately measured, and using these values, the apparent grafting efficiency is calculated by the following formula.

Apparent grafting efficiency (%)=[$b$/{$a$×(100−$c$)/100}]×100

When this apparent grafting efficiency is too small, there is a tendency that various stabilities of the aqueous emulsion become insufficient because the protective colloidal ability by the PVA-based resin becomes insufficient. In addition, it is difficult that the apparent grafting efficiency exceeds 75%, and when such a value becomes too large, the polymerization stability is lowered depending on the kind of the acrylic-based monomer, so that there is a tendency that a stable aqueous emulsion becomes unable to obtain.

In addition, solid matter concentration of the aqueous emulsion of the invention is generally from 10 to 60%, and particularly those having solid matter concentration of from 38 to 52% is suitably used. When the solid content is too low, the emulsion particles are apt to precipitate so that there is a tendency that the preservation stability becomes low or the freezing stability becomes low, when it is too high on the contrary, there is a tendency that the workability is inhibited.

In this connection, this solid matter concentration of the aqueous emulsion means the residue when the aqueous emulsion is dried at 105° C. for 3 hours.

The emulsion of the invention is excellent in film-forming property, and this is evident from the fact that the difference between glass transition point (Tg) of the polymer of ethylenically unsaturated monomer in the aqueous emulsion and minimum film-forming temperature (MFT) of the aqueous emulsion, (Tg−MFT), is large. The value of Tg−MFT in the aqueous emulsion of the invention is generally 4° C. or more, and particularly those having The value of Tg−MFT of from 6 to 10° C. is suitably used.

In this connection, this minimum film-forming temperature (MFT) of the aqueous emulsion represents a minimum temperature at which emulsion particles are fused to form a continued film when the emulsion is coated on a base material or the like, and greatly undergoes influence of the polymer composition in the emulsion, namely Tg of the polymer and affinity with the dispersion medium, but is generally 40° C. or less, and particularly those having the MFT of from −20 to 40° C., especially those having the MFT of from 0 to 30° C. are suitably used.

Glass transition point (Tg) of the polymer of ethylenically unsaturated monomer is generally 110° C. or less, and those having the Tg of from 0 to 40° C. are suitably used.

According to the invention, it is considered that the minimum film-forming temperature is lowered because of the crowding of particles due to increase of capillary pressure among particles caused by the small particle size of emulsion and because the PVA-based resin comprising a specified structure to be used in the invention acts as a film-forming supplementary agent, and its difference in temperature from the TG becomes large as a result.

Next, method for producing the emulsion of the invention is described.

The method for producing the emulsion of the invention is not particularly limited, but there may be mentioned a method in which a monomer is subjected to emulsion polymerization in an aqueous medium, a method in which a polymer is emulsified and dispersed in water, and the like, preferred of which is an emulsion polymerization by a pre-emulsion method in which a pre-emulsion obtained by emulsifying and dispersing a monomer in water in the presence of a PVA-based resin, a surfactant or the like is polymerized while adding it dropwise to a polymerization reaction system, and a pre-emulsion method which uses, as such a dispersant, a PVA-based resin comprising a 1,2-diol structural unit represented by the following general formula (1) and having a degree of saponification of from 80 to 93% by mol is particularly preferably used.

Such a PVA-based resin is excellent in its affinity for both of the ethylenically unsaturated monomer and its polymer and firstly acts as a dispersant in preparing a pre-emulsion by minutely dispersing such a monomer in water, and an emulsion which comprises a polymer comprising extremely small particle size as the dispersoid can be obtained by adding such a pre-emulsion dropwise to a reaction system that contains a polymerization initiator and is set to a reaction temperature, and thereby carrying out emulsion polymerization.

In addition, generally in an emulsion obtained by the pre-emulsion method, grafting efficiency of the PVA-based resin used as the dispersant is apt to lower due to reduced particle size, but since the PVA-based resin to be used in the invention has high grafting capacity, a high grafting efficiency can be obtained and an emulsion having high stabilities can be obtained.

The following illustratively describes on the production method by the pre-emulsion method which uses, as the dispersant, such a PVA resin comprising a 1,2-diol structural unit represented by the general formula (1).

The PVA-based resin to be used in such a pre-emulsion method has a structural unit represented by the following formula (1), and in the general formula (1), $R^1$, $R^2$ and $R^3$ each independently represent a hydrogen atom or an organic group, X represents a single bond or a bonding chain, and $R^4$, $R^5$ and $R^6$ each independently represent a hydrogen atom or an organic group.

[Chem. 3]

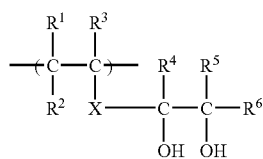

(1)

It is desirable that all of the $R^1$ to $R^3$ and $R^4$ to $R^6$ in the 1,2-diol structural unit represented by the general formula (1) are hydrogen atoms, and a PVA-based resin comprising a structural unit represented by the following general formula (1') is suitably used.

[Chem. 4]

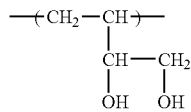

(1')

In this connection, the $R^1$ to $R^3$ and $R^4$ to $R^6$ in the structural unit represented by the general formula (1) may be an organic group with the proviso that it is in such an amount that it does not sharply spoil characteristics of the resin, and the organic group is not particularly limited, but for example, alkyl groups having from 1 to 4 carbon atoms such as methyl group, ethyl group, n-propyl group, isopropyl group, n-butyl group, isobutyl group and tert-butyl group are desirable, and, as occasion demands, the organic group may have a substituent group such as a halogen group, a hydroxyl group, an ester group, a carbonate group, a sulfonate group and the like.

In addition, X in the 1,2-diol structural unit represented by the general formula (1) is typically a single bond, and single bond is most desirable from the viewpoint of thermal stability and of structural stability under high temperature/under acidic condition, but it may be a bonding chain with the proviso that it is within such a range that it does not spoil the effect of the invention, and such a bonding chain is not particularly limited and there may be mentioned hydrocarbons such as alkylene, alkenylene, alkynylene, phenylene and naphthylene (these hydrocarbons may be substituted with halogens such as fluorine, chlorine or bromine, and the like), as well as —O—, —(CH$_2$O)$_m$—, —(OCH$_2$)$_m$—, —(CH$_2$O)$_m$ CH$_2$—, —CO—, —COCO—, —CO(CH$_2$)$_m$—CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi (OR)$_2$O—, —Al(OR)—, —OAl(OR)—, —OAl(OR)O— and the like (R is each independently an optional substituent group of which a hydrogen atom or an alkyl group is desirable, and m is a natural number). Particularly, an alkylene group having 6 or less carbon atoms, particularly methylene group, or —CH$_2$OCH$_2$— is desirable from the viewpoint of stability at the time of production or at the time of application.

Though the production method of the PVA-based resin to be used in the invention is not particularly limited, (i) a method in which a copolymer of a vinyl ester-based monomer and a compound represented by the following general formula (2) is subjected to saponification, (ii) a method in which a copolymer of a vinyl ester-based monomer and a compound represented by the following general formula (3) is subjected to saponification and decarboxylation and (iii) a method in which a copolymer of a vinyl ester-based monomer and a compound represented by the following general formula (4) is subjected to saponification and deketalization are suitably used.

[Chem. 5]

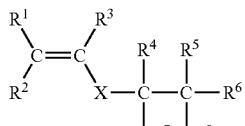

(2)

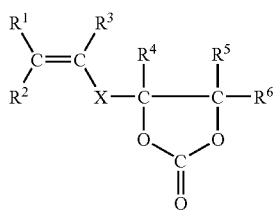

(3)

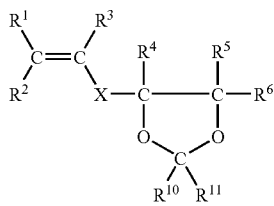

(4)

In the above-mentioned general formulae (2), (3) and (4), all of $R^1$, $R^2$, $R^3$, X, $R^4$, $R^5$ and $R^6$ are the same as the case of the general formula (1). Each of $R^7$ and $R^8$ is independently a hydrogen atom or $R^9$—CO— (in the formula, $R^9$ is an alkyl group). Each of $R^{10}$ and $R^{11}$ is independently a hydrogen atom or an organic group.

Regarding the methods of (i), (ii) and (iii), for example, the methods described in JP-A-2006-95825 can be employed.

Particularly, from the viewpoint of being excellent in copolymerization reactivity and industrial handling ability, it is desirable to use, as the compound represented by the general formula (2) in the method of (i), a 3,4-diacyloxy-1-butene wherein R' to $R^6$ are hydrogen, X is a single bond, $R^7$ and $R^8$ are $R^9$—CO— and $R^9$ is an alkyl group, and further among them, 3,4-diacetoxy-1-butene wherein $R^9$ is methyl group is particularly suitably used.

In this connection, the reactivity ratio of each monomer when vinyl acetate is used as the vinyl ester-based monomer and this is copolymerized with 3,4-diacetoxy-1-butene is r (vinyl acetate)=0.710 and r (3,4-diacetoxy-1-butene)=0.701, and this shows that 3,4-diacetoxy-1-butene is excellent in its copolymerization reactivity with vinyl acetate, in comparison with the case of vinyl ethylene carbonate as the compound represented by the general formula (3) used in the method of (ii), namely r (vinyl acetate)=0.85 and r (vinyl ethylene carbonate)=5.4.

In addition, chain transfer constant of 3,4-diacetoxy-1-butene is C×(3,4-diacetoxy-1-butene)=0.003 (65° C.), and this shows that it does not cause a difficulty in increasing degree of polymerization and a lowering of rate of polymerization, in comparison with the C×(vinyl ethylene carbonate)=0.005 (65° C.) in the case of vinyl ethylene carbonate and the C×(2,2-dimethyl-4-vinyl-1,3-dioxolan)=0.023 (65° C.) in the case of 2,2-dimethyl-4-vinyl-1,3-dioxolan which is the compound represented by the general formula (4) to be used in the method of (iii).

In addition, since the by-product which is generated when a copolymer of this 3,4-diacetoxy-1-butene is saponified is the same compound by-produced at the time of saponification from a structural unit derived from vinyl acetate frequently used as a vinyl ester-based monomer, it is not necessary to arrange a special device or process to its after treatment and solvent recovery system, so that a point that the existing facilities can be used is also an industrially considerable advantage.

In this connection, regarding the above-mentioned 3,4-diacetoxy-1-butene, it is able to obtain a product produced, for example, by the synthesis route described in WO 00/24702 which uses 1,3-butadiene as the starting substance and a product produced using an epoxybutene derivative as an intermediate, by the techniques described in U.S. Pat. No. 5,623,086 and U.S. Pat. No. 6,072,079, and the products of Acros at the reagent level can be obtained respectively from the market. Also, the 3,4-diacetoxy-1-butene obtained as a by-product during the 1,4-butanediol production process can also be used by purifying it.

Also, the 1,4-diacetoxy-1-butene as an intermediate product during the 1,4-butanediol production process can also be used by converting it into 3,4-diacetoxy-1-butene by carrying out a conventionally known isomerization reaction using metallic catalyst such as palladium chloride. In addition, it is also possible to produce it in accordance with the organic diester production method described in republished WO 00/24702.

In this connection, in the case of the PVA-based resin obtained by the method of (ii) or (iii), carbonate ring or acetal ring sometimes remains on the side chain when the degree of saponification is low or decarboxylation or deacetalization is insufficient, and as a result, there is a tendency that amount of coarse particles in the aqueous emulsion prepared using such a PVA-based resin as the dispersant is increased, so that the PVA-based resin obtained by the method of (i) is most suitable for this application from these points of view.

As the above-mentioned vinyl ester-based monomer, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate and the like, of which vinyl acetate is preferably used from the economical point of view.

Also, in addition to the above-mentioned monomers (compounds represented by the general formulae (2), (3) and (4)), as copolymerization components, compounds including: α-olefins such as ethylene and propylene; hydroxyl group-containing α-olefins such as 3-buten-1-ol, 4-penten-1-ol and 5-hexene-1,2-diol, and derivatives thereof such as acylation products; unsaturated acids such as itaconic acid, maleic acid and acrylic acid or alts or mono or dialkyl esters thereof; nitriles such as acrylonitrile, amides such as methacrylamide and diacetoneacrylamide, olefinsulfonic acid such as ethylenesulfonic acid, allylsulfonic acid, metharylsulfonic acid and AMPS and salts thereof and the like may be copolymerized within such a range that they do not exert sharp influences on the resin physical properties.

Degree of saponification of the PVA-based resin to be used in the invention (measured in accordance with JIS K 6726) is preferably from 80 to 93% by mol, particularly preferably from 85 to 90% by mol. When such a degree of saponification is too low, there will be a case in which insoluble matter of the PVA-based resin is precipitated during the polymerization caused by a clouding point phenomenon and inhibits polymerization, and when it is too high on the contrary, there is a tendency that the pre-emulsion monomer liquid becomes unstable.

In general, since emulsion polymerization is carried out at a temperature of from 70 to 80° C., as the PVA-based resin to be used as the dispersant in this, a substance having a clouding point of 80° C. or more is used, and a substance of 90° C. or more is particularly preferably used. When such a clouding point is too low, here will be a case in which the PVA-based resin is precipitated during the polymerization in the same way as described in the above and the emulsion aggregates thereby.

However, though it is not desirable from the productivity point of view, it is also possible to use a PVA-based resin having a clouding point of less than 80° C. in case that the emulsion polymerization is carried out at a further low temperature with the aim of achieving high degree of polymerization.

In this connection, regarding such a clouding point of the PVA-based resin, a PVA-based resin aqueous solution having a solid matter concentration of 0.1% is adjusted to a temperature of 23° C., temperature rising of this is carried out at a rate of 1° C./min, and the temperature when its absorbance at 430 nm exceeded 0.1 is used as the clouding point.

In addition, average degree of polymerization of the PVA-based resin (measured in accordance with JIS K 6726) to be used preferably is generally from 50 to 4000, particularly from 100 to 2000, further from 200 to 800. When such an average degree of polymerization is too low, the protective colloidal ability cannot be obtained, and when it is too high on the contrary, viscosity of the obtained emulsion becomes so high that it sometimes becomes difficult to carry out the polymerization because agitation cannot be carried out during the polymerization.

A content of 1,2-diol structural unit contained in the PVA-based resin is generally from 2 to 15% by mol, particularly from 3 to 12% by mol, further preferably from 4 to 10% by mol. When such a content is too small, there is a tendency that an emulsion having stable grafting performance of the PVA-based resin for acrylic resin cannot easily be obtained, and when it is too large on the contrary, hydrophilic property of PVA becomes too high or average chain length of the residual acetic acid ester group becomes short, so that there is a tendency in that the pre-emulsion becomes unstable due to lowering of the adsorption performance for the acrylic-based monomer.

In this connection, the content of 1,2-diol structural unit in the PVA-based resin can be calculated from the $^1$H-NMR spectrum (solvent: DMSO-d6, internal standard: tetramethylsilane) of completely saponified PVA-based resin, and illustratively, it may be calculated from peak areas derived from hydroxyl group proton, methine proton and methylene proton in the 1,2-diol unit, methylene proton of the main chain, proton of hydroxyl group connecting to the main chain and the like.

Next, a method is described on the production of a pre-emulsion in which an ethylenically unsaturated monomer is dispersed in water using, as the dispersant, a PVA-based resin comprising a 1,2-diol structural unit represented by the above-mentioned general formula (1).

As the using amount of the PVA-based resin which is used as the dispersant in the pre-emulsion, it varies to some extent depending on its kinds, resin content of the emulsion and the like, within the range of generally from 0.1 to 100 parts by weight, particularly from 1 to 50 parts by weight, further from 3 to 10 parts by weight, based on 100 parts by weight of the dispersoid, is preferably used. When this using amount of the PVA-based resin is too large, there is a tendency of lowering water resistance of film obtained from the aqueous emulsion, and when it is too small, there is a tendency of being not able to obtain a proper pre-emulsion because of the lowering of dispersion stability of the monomer, which is not desirable.

As the production method of such a pre-emulsion, for example, there may be mentioned a method in which an ethylenically unsaturated monomer is added dropwise to an aqueous solution of the above-described PVA-based resin while agitating the latter. As the agitator in that case, agitating and mixing by agitator blade, similar to the one which is used at the time of emulsion polymerization, and conventionally known dispersing machines such as static mixer, vibromixer and homogenizer can be used, of which the agitating and mixing by agitator blade is suitable.

The thus obtained pre-emulsion comprising the ethylenically unsaturated monomer is subjected to emulsion polymerization by adding it dropwise to a reaction liquid comprising a polymerization initiator and water, in a reaction container equipped with an agitator and a reflux condenser.

As the polymerization initiator, in general, common potassium persulfate, ammonium persulfate, potassium bromate and the like are used each independently or concomitantly with acidic sodium sulfite, further, water-soluble redox system polymerization initiators such as hydrogen peroxide-tartaric acid, hydrogen peroxide-iron salt, hydrogen peroxide-ascorbic acid-iron salt, hydrogen peroxide-rongalit or hydrogen peroxide-rongalit-iron salt are used, and illustratively, catalyst consisting of an organic peroxide and a redox system such as "Kayabutyl B" manufactured by Kayaku Akuzo Co., Ltd., or "Kayabutyl A-50C" manufactured by the same company can also be used. Particularly, ammonium persulfate is suitably used from the polymerization stability point of view.

Adding method of the polymerization initiator is not particularly limited, and a method for adding it in one lot at an early stage, a method for adding it continuously with the progress of polymerization, and the like can be employed.

Using amount of such a polymerization initiator cannot be said in a wholesale manner because it depends on the kind of the monomer to be used, polymerization conditions and the like, but it is suitably used within the range of generally from 0.01 to 1 part by weight, particularly from 0.01 to 0.5 part by weight, based on 100 parts by weight of the ethylenically unsaturated monomer.

In addition, the temperature to be suitably employed at the time of polymerization reaction is within the range of generally from 40 to 90° C., particularly from 60 to 80° C.

Dropping rate of the pre-emulsion to the reaction liquid cannot be said in a wholesale manner because it depends on the reactivity of the ethylenically unsaturated monomer to be used, using amount of the polymerization initiator, reaction temperature and the like, so that it may be optionally decided by observing conditions of the temperature of reaction liquid by heat of polymerization, and the like.

In this connection, it is possible that a part of the pre-emulsion, for example from 5 to 20% of the total amount, is put into the reaction liquid in advance, and the remaining pre-emulsion is added dropwise thereto in response to the progress of polymerization. In addition, it is also a desirable embodiment to arrange an aging stage for a certain period of time after dropping entire volume of the pre-emulsion.

It is desirable that the emulsion of the invention uses a PVA-based resin alone as the dispersant, but can further use another water-soluble polymer, a nonionic surfactant or an anionic surfactant jointly therewith.

In this connection, when other dispersant is jointly used, it is desirable that the content of the PVA-based resin is generally 70% by weight or more, particularly 80% by weight or more, further 90% by weight or more.

As the water-soluble polymer which can be jointly used other than the above-mentioned PVA-based resin, there may be mentioned unmodified PVA, carboxyl group-containing PVA, formalized, acetalized, butyralized or urethanated PVA, PVA of an esterificated product and the like with sulfonic acid, carboxylic acid or the like and acetoacetylated PVA, diacetoneacrylamide-modified PVA, PVA with Thiol end group, PVA in which amount of the main chain 1,2-glycol bond obtained by high temperature high pressure polymerization is 1.8% by mol or more, ethylene oxide-modified PVA, a saponification product of copolymer of a vinyl ester with a monomer copolymerizable therewith, and the like. As the monomer copolymerizable with a vinyl ester, there may be mentioned olefins such as ethylene, butylene, isobutylene, α-octene, α-dodecene and α-octadecene, unsaturated acids such as acrylic acid, methacrylic acid, crotonic acid, maleic acid, maleic anhydride or itaconic acid or salts or mono- or dialkyl esters thereof, nitriles such as acrylonitrile and methacrylonitrile, amides such as acrylamide, diacetoneacrylamide and methacrylamide, olefinsulfonic acids such as ethylenesulfonic acid, allylsulfonic acid and methacrylsulfonic or salts thereof, alkyl vinyl esters, vinyl ketone, N-vinylpyrrolidone, vinyl chloride, vinylidene chloride and the like. Particularly when ethylene is copolymerized, a range of from 0.1 to 19% by mol is desirable.

In addition, as the above-mentioned water-soluble polymer other than PVA, there may be mentioned cellulose derivatives such as methyl cellulose, ethyl cellulose, hydroxymethyl cellulose, hydroxypropyl cellulose, hydroxybutylmethyl cellulose, hydroxyethyl cellulose, carboxymethyl cellulose, aminomethylhydroxypropyl cellulose and aminoethylhydroxypropyl cellulose, starch, tragacanth, pectin, glue, alginic acid or a salt thereof, gelatin, polyvinylpyrrolidone, polyacrylic acid or a salt thereof, polymethacrylic acid or a salt thereof, polyacrylamide, polymethacrylamide, a copolymer of vinyl acetate with unsaturated acid such as maleic acid, maleic anhydride, acrylic acid, acrylic acid, methacrylic acid, itaconic acid, fumaric acid or crotonic acid, a copolymer of styrene with the above-mentioned unsaturated acid, a copolymer of a vinyl ether with the above-mentioned unsaturated acid and salts or esters of the above-mentioned copolymers.

As the nonionic surfactant, for example, a polyoxyethylene-alkyl ether type, a polyoxyethylene-alkylphenol type, a polyoxyethylene-polyhydric alcohol ester type, an ester of a polyhydric alcohol with a fatty acid, an oxyethylene•oxypropylene block polymer and the like can be mentioned.

As the anionic surfactant, for example, a higher alcohol sulfate, a higher fatty acid alkali salt, a polyoxyethylene alkylphenol ether sulfate, an alkyl-benzene sulfonate, naphthalene sulfonate/formalin condensate, an alkyldiphenyl ether sulfonate, a dialkyl-sulfosuccinate, a higher alcohol phosphoric acid ester salt and the like can be mentioned.

Further, plasticizers such as a phthalic acid ester and a phosphoric acid ester, pH adjusting agents such as sodium carbonate, sodium acetate and sodium phosphate, and the like can also be used concomitantly.

In addition, chain transfer agents such as an iron compound and methanol may also be used concomitantly as an auxiliary for controlling polymerization reactivity.

In response to its applications, using purposes and the like, the thus obtained aqueous emulsion of the invention can be mixed optionally with additive agents corresponding to respective applications such as a pigment, a dispersant, an antifoamer, an oil solution, a viscosity modifier, a tackifier, a thickener, a water-holding agent, a fiber-softening agent, a smoothing agent or an antistatic agent.

In addition, it is possible to make the aqueous emulsion of the invention into a powder emulsion by spray-drying this, and in that case, it is desirable to post-add a PVA-based resin, particularly an ethylene-modified PVA, a partially saponified PVA or the like, with the aim of improving powdering and redispersibility.

In addition, it is possible to sharply improve water whitening resistance of the film of the aqueous emulsion of the invention, by effecting crosslinking of the PVA-based resin in the dry film through the concomitant use of a crosslinking agent.

It is considered that a continuous phase of PVA-based resin is present in the dry film of aqueous emulsion obtained using the PVA-based resin as the dispersant, and when such a film contacts with water, the PVA-based resin swells to a size of the range of visible ray or is eluted to generate voids, thereby generating a difference in refractive index from the phase consisting of dispersoid to cause the whitening.

In the aqueous emulsion of the invention, such a whitening of dry film by water is improved by forming minute continuous phase of the PVA-based resin through reduction of particle size of the dispersoid, but further improvement may be achieved by carrying out crosslinking of the PVA-based resin and thereby inhibiting the swelling and elution caused by water.

As the crosslinking agent to be used in the aqueous emulsion of the invention, those which are conventionally known as crosslinking agents of PVA-based resins can be used, and illustratively, there may be mentioned a methylol compound and a silicone compound, which undergo condensation reaction with the hydroxyl group in PVA-based resins, an aldehyde compound which undergoes acetalization reaction, an epoxy compound which forms ether bond, inorganic based compound which forms a chelate such as and zirconium, titanium, aluminum or boron.

Particularly, a methylol compound and a zirconium compound which are excellent in crosslinking reactivity at low temperature are suitable.

As such a methylol compound, methylolmelamine, methylolurea, methylolbisphenol S and the like can be mentioned, of which methylolmelamine is particularly suitably used.

In addition, as the zirconium compound, zirconium chloride, zirconium acetate, zirconyl acetate, zirconium nitrate, zirconyl nitrate, zirconium sulfate, zirconyl sulfate, zirconium acetylacetonate, ammonium zirconium carbonate, potassium zirconium carbonate, zirconyl octylate, zirconium oxychloride, zirconium hydroxychloride, zirconyl hydroxychloride and the like can be mentioned.

Also, when a methylol compound is used as a cross-linking agent, the crosslinking reaction progresses further effectively within an acidic area, particularly at pH 3 or less. In this connection, in the case of the aqueous emulsion obtained using potassium persulfate or ammonium persulfate as the polymerization initiator at the time of emulsion polymerization, the system becomes acidic after the polymerization so that it is not necessary to particularly carry out pH adjustment.

In addition, in the case of zirconium carbonate and potassium zirconium carbonate, the crosslinking reaction is effectively generated in neutral to alkaline range, so that these can be suitably used as crosslinking agents for those which used a redox system polymerization initiator from which an aqueous emulsion of such a pH range can be obtained.

Though blending amount of such a crosslinking agent cannot be said in a wholesale manner because it depends on its purpose, it is suitably used within the range of generally from 0.1 to 150 parts by weight, particularly from 1 to 100 parts by weight, further from 5 to 50 parts by weight, especially from 10 to 30 parts by weight, based on 100 parts by weight of the PVA-based resin. When blending amount of such a crosslinking agent is too small, there may be a case in which sufficient water whitening resistance cannot be obtained, and when it is too large on the contrary, there may be a tendency in that stability of the aqueous emulsion is lowered and its viscosity is increased.

EXAMPLES

The following describes the invention with reference to examples, but the invention is not restricted by the descriptions of the examples without exceeding its gist.

In this connection, the "part" and "%" in the examples mean weight basis unless otherwise noted.

Example 1

Production of PVA-Based Resin

Firstly, 1500 parts of vinyl acetate, 174 parts (6% by mol, based on adding vinyl acetate) of 3,4-diacetoxy-1-butene, 300 parts of methanol and 0.2% by mol (based on adding vinyl acetate) of azobisisobutyronitrile (AIBN) were prepared.

Subsequently, whole amounts of the methanol and AIBN and 20% portions of the vinyl acetate and 3,4-diacetoxy-1-butene were added to a reaction container equipped with a reflux condenser, a dropping funnel and an agitator, and polymerization was started by increasing temperature under a stream of nitrogen while stirring. The remaining portions (80% for each) of vinyl acetate and 3,4-diacetoxy-1-butene were added dropwise thereto spending 7 hours, the polymerization was completed by adding a predetermined amount of m-dinitrobenzene when rate of polymerization of vinyl acetate reached 90%, and then a methanol solution of copolymer was obtained by removing unreacted vinyl acetate monomer from the system through distillation while blowing methanol steam through the system.

Next, the above-mentioned solution was adjusted to a concentration of 40% and put into a kneader, and while keeping the solution temperature at 40° C., saponification was carried out by adding a 2% methanol solution of sodium hydroxide at a ratio of 3.8 mmol based on 1 mol in total amount of the vinyl acetate structural unit and 3,4-diacetoxy-1-butene structural unit in the copolymer. When the saponified product was precipitated and became particulate matter with the progress of saponification, acetic acid for neutralization use was added in an amount of 5 equivalents of sodium hydroxide, and the particulate was separated by filtration, thoroughly washed with methanol and then dried in a hot air drier to obtain a PVA-based resin comprising the 1,2-diol structural unit represented by the aforementioned formula (1').

Degree of saponification of the thus obtained PVA-based resin was 89% by mol when analysis was carried out based on the amount of alkali consumption required for hydrolyzing the residual vinyl acetate and 3,4-diacetoxy-butene, and average degree of polymerization was 500 when analysis was carried out in accordance with JIS K 6726. In addition, the content of the 1,2-diol structural unit was 6% by mol when calculated by measuring it by $^1$H-NMR (internal standard substance; tetramethylsilane). In this connection, clouding point of this PVA-based resin was 90° C. or more.

[Preparation of Pre-Emulsion]

Using this PVA-based resin as the dispersant, 216 parts of methyl methacrylate and 177 parts of n-butyl acrylate were added dropwise to a reaction container charged with 9.2 parts of this PVA-based resin and 317 parts of water spending 30 minutes while agitating at 300 rpm to effect their mixing and dispersion, and then the agitation was continued for 30 minutes to prepare a pre-emulsion.

[Emulsion Polymerization]

A separable flask equipped with a puddle-type mixing blade, a reflux condenser, a dropping funnel and a thermometer was charged with 635 parts of water, 18.3 parts of the PVA-based resin and 71.9 parts, namely 1/10, of the pre-emulsion prepared in advance, and temperature in the flask was increased to 75° C. while agitating at an agitation rate of 230 rpm.

After carrying out 1 hour of initial polymerization by adding 8.4 parts of a 5% aqueous solution of ammonium persulfate, 647.1 parts, as 9/10, of the pre-emulsion was added dropwise thereto spending 3.5 hours. Thereafter, this was subjected to 90 minutes of aging and then cooled to ordinary temperature to obtain an emulsion. In this connection, 2.4 parts for each of the 5% aqueous solution of ammonium persulfate was added 7 times in total at 30 minute intervals after commencement of the dropwise addition of pre-emulsion, and 1.4 parts for each of the 5% aqueous solution of ammonium persulfate was added 2 times in total at 45 minute intervals during the 90 minutes of aging step.

Average particle size, apparent grafting efficiency, glass transition point (Tg) and minimum film-forming temperature (MFT) of the aqueous emulsion obtained in the above were measured in the following manner.

(Average Particle Size)

A highly diluted and highly dispersed sample for evaluation use was prepared by adding 0.1 g of the thus obtained aqueous emulsion dropwise to 50 g of water and applying a supersonic wave thereto for 5 minutes. Particle sizes of the emulsion in this sample at 23° C. were measured using "NICOMP 380" manufactured by Particle Sizing Systems, and average particle diameter by Volume-Wt NICOMP DISTRIBUTION mode was calculated.

(Apparent Grafting Efficiency)

The aqueous emulsion was coated on a PET film using an applicator for 100 μm use and dried while allowing it to stand still for 24 hours under an atmosphere of 23° C. and 50% RH, thereby preparing a film. About 1 g of this (a) was precisely weighed and soaked in methyl acetate of 50° C., hot water of 98° C., toluene of 98° C., hot water of 98° C. and methyl ethyl ketone of 50° C., respectively, each for 6 hours, and its dry weight b (g) was calculated. In addition, the volatile matter content c (%) of the film before the test was separately measured, and using these values, the apparent grafting efficiency was calculated by the following formula.

$$\text{Apparent grafting efficiency (\%)} = [b/\{a \times (100-c)/100\}] \times 100$$

(Glass Transition Point)

A cast film prepared at ordinary temperature was subjected to vacuum drying, the thus obtained sample was treated by DSC (Thermal analysis mfd. by Perkin-Elmer) and glass transition point (Tg) of the second run obtained within a temperature range of from −20° C. to 150° C. and at a programming rate of 10° C./min was calculated.

(Minimum Film-Forming Temperature)

Using a film forming temperature measuring device manufactured by Yoshimitsu Seiki, the aqueous emulsion was coated using a 100 μm coater on an evaluation plate having a temperature gradient within the range of from −5 to 40° C., and after allowing it to stand still for 12 hours, forming condition of the film was observed with the naked eye and the temperature of the boundary where a transparent film was formed was read and regarded as minimum film-forming temperature (MFT).

Next, the following evaluations were carried out on the thus obtained aqueous emulsions. The results are shown in Tables 2 to 5.

(Chemical Stability)

Each aqueous emulsion was diluted with water to a solid mater concentration of 1%, a 10 g portion thereof was mixed with 0.5 g of magnesium sulfate and stirred with the hand and then the conditions were observed with the naked eye for 30 minutes and evaluated as follows.

A . . . no change

B . . . precipitation of aggregates (Freezing Stability)

A 50 g portion of each aqueous emulsion was put into a 100 ml capacity poly vessel and the emulsion was frozen by allowing it to stand for 16 hours in a refrigerator of −5° C. Thereafter, the emulsion was defrosted by allowing it to stand for 6 hours in a constant temperature bath of 20° C. By repeating this three times, its condition was observed and evaluated as follows.

A . . . stable

B . . . aggregation (Adhesive Strength)

Tension shear type single lap shear strength test specimens were prepared using monarch birch (average specific gravity 0.7, moisture content 9%) as the wood sample, coating each aqueous emulsion on its surface to a thickness of 300 g/m$^2$, uniting the coated faces and carrying out compression adhesion at 1 MPa for 24 hours. After humidification under a condition of 23° C. and 50% RH for 1 week or more, a tensile test was carried out at a test speed of 10 mm/min using TENSILON STM-F1000P manufactured by TOYO BALDWIN Co., Ltd., and ratio of destruction of not the adhered side but the wood sample part among 8 test specimens (wood destruction ratio) was calculated.

(Film Transparency)

A film was prepared by coating each aqueous emulsion on a PET film to a film thickness of from 60 to 80 μm and allowed to stand under an environment of 23° C. and 50% RH for 2 days. Transparency of this film was measured in accordance with JIS K 7105 using a haze meter ("Haze Meter NDH 2000" mfd. by NIPPON DENSHOKU Co., Ltd.), and the haze value based on a film thickness of 10 μm was calculated.

(Water Whitening Resistance)

After soaking the film used in the evaluation of film transparency in water of 23° C. for 3 hours, its transparency was measured in accordance with JIS K 7105 using a haze meter ("Haze Meter NDH 2000" mfd. by NIPPON DENSHOKU Co., Ltd.), and the haze value based on a film thickness of 10 µm was calculated.

Further, 20 parts by weight of methylolmelamine was added to each aqueous emulsion, based on 100 parts by weight of the PVA-based resin in the emulsion, this was coated on a PET film to a film thickness of from 60 to 80 µm and allowed to stand under an environment of 23° C. and 50% RH for 3 days, and the crosslinked film obtained in this manner was also subjected to the same evaluation.

Example 2

Preparation of Pre-Emulsion

A pre-emulsion was prepared by adding 193 parts of methyl methacrylate and 157 parts of n-butyl acrylate dropwise to a reaction container charged with 23.3 parts of the same PVA-based resin of Example 1 and 317 parts of water spending 30 minutes while agitating at 300 rpm to effect their mixing and dispersion, and then continuing the agitation for 30 minutes.

[Emulsion Polymerization]

A separable flask equipped with a puddle-type mixing blade, a reflux condenser, a dropping funnel and a thermometer was charged with 635 parts of water, 46.7 parts of the PVA-based resin and 69.1 parts, namely 1/10, of the pre-emulsion prepared in advance, and temperature in the flask was increased to 75° C. while agitating at an agitation rate of 230 rpm.

After carrying out 1 hour of initial polymerization by adding 8.4 parts of a 5% aqueous solution of ammonium persulfate, 621.1 parts, as 9/10, of the pre-emulsion was added dropwise thereto spending 3.5 hours. Thereafter, this was subjected to 90 minutes of aging and then cooled to ordinary temperature to obtain an emulsion. In this connection, 2.4 parts for each of the 5% aqueous solution of ammonium persulfate was added 7 times in total at 30 minute intervals after commencement of the dropwise addition of pre-emulsion, and 1.4 parts for each of the 5% aqueous solution of ammonium persulfate was added 2 times in total at 45 minute intervals during the 90 minutes of aging step.

The thus obtained aqueous emulsion was evaluated in the same manner as in Example 1. The results are shown in Tables 2 to 5.

Example 3

An aqueous emulsion was prepared in the same manner as in Example 1, except that monomers in the pre-emulsion in Example 1 were changed to 193 parts by weight of styrene and 157 parts by weight of n-butyl acrylate, and evaluated in the same manner. The results are shown in Tables 2 to 5.

Example 4

An aqueous emulsion was prepared in the same manner as in Example 1, except that a PVA-based resin obtained in accordance with Example 1, having a content of a side chain 1,2-diol structural unit of 6% by mol, a degree of polymerization of 500 and a degree of saponification of 92.6% by mol, was used as the PVA-based resin of Example 1, and evaluated in the same manner. The results are shown in Tables 2 to 5.

Comparative Example 1

Production of PVA-Based Resin

Firstly, 1500 parts of vinyl acetate, 87 parts (3% by mol, based on adding vinyl acetate) of 3,4-diacetoxy-1-butene, 600 parts of methanol and 0.3% by mol (based on adding vinyl acetate) of azobisisobutyronitrile (AIBN) were prepared.

Subsequently, whole amounts of the methanol and AIBN and 10% portions of the vinyl acetate and 3,4-diacetoxy-1-butene were added to a reaction container equipped with a reflux condenser, a dropping funnel and an agitator, and polymerization was started by increasing temperature under a stream of nitrogen while stirring. Further, the remaining portions (90% for each) of vinyl acetate and 3,4-diacetoxy-1-butene were added dropwise thereto spending 9 hours, the polymerization was completed by adding a predetermined amount of m-dinitrobenzene when rate of polymerization of vinyl acetate reached 90%, and then a methanol solution of copolymer was obtained by removing unreacted vinyl acetate monomer from the system through distillation while blowing methanol steam through the system.

Next, the above-mentioned solution was adjusted to a concentration of 45% and put into a kneader, and while keeping the solution temperature at 40° C., saponification was carried out by adding a 2% methanol solution of sodium hydroxide at a ratio of 5 mmol based on 1 mol in total amount of the vinyl acetate structural unit and 3,4-diacetoxy-1-butene structural unit in the copolymer. In addition, after 30 minutes of the starting of the increase of viscosity, the 2% methanol solution of sodium hydroxide was further added in the same manner at a ratio of 2 mmol. When the saponified product was precipitated and became particulate matter with the progress of saponification, acetic acid for neutralization use was added in an amount of 5 equivalents of sodium hydroxide, and the particulate was separated by filtration, thoroughly washed with methanol and then dried in a hot air drier to obtain a PVA-based resin comprising the 1,2-diol structural unit represented by the aforementioned formula (1').

Degree of saponification of the thus obtained PVA-based resin was 98.6% by mol when analysis was carried out based on the amount of alkali consumption required for hydrolyzing the residual vinyl acetate and 3,4-diacetoxy-butene, and average degree of polymerization was 300 when analysis was carried out in accordance with JIS K 6726. In addition, the content of the 1,2-diol structural unit was 3% by mol when calculated by measuring it by $^1$H-NMR (internal standard; tetramethylsilane). In this connection, clouding point of this PVA-based resin was 90° C. or more.

[Emulsion Polymerization]

A separable flask equipped with a puddle-type mixing blade, a reflux condenser, a dropping funnel and a thermometer was charged with 746 parts of a 6.14% aqueous solution the thus obtained PVA-based resin, and temperature was increased to 75° C. while agitating at an agitation rate of 230 rpm. After carrying out initial polymerization by adding thereto 36.0 parts of methyl methacrylate, 29.4 parts of n-butyl acrylate and 8.4 parts of ammonium persulfate and agitating for 1 hour, a mixture of 324 parts of methyl methacrylate and 265 parts of n-butyl acrylate was added dropwise thereto spending 3.5 hours, aging was further carried out for 90 minutes and then this was cooled to ordinary temperature to obtain an emulsion. In this connection, 2.4 parts for each of the 5% aqueous solution of ammonium persulfate was added 7 times in total at 30 minute intervals after commencement of the dropwise addition of pre-emulsion, and 1.4 parts for each of the 5% aqueous solution of ammonium persulfate was added 2 times in total at 45 minute intervals during the 90 minutes of aging step. The aqueous emulsion was evaluated in the same manner as in Example 1. The results are shown in Tables 2 to 5.

Comparative Example 2

An aqueous emulsion was prepared in the same manner as in Example 1, except that a PVA-based resin comprising 4.3% by mol of side chain ethylene oxide group (chain length 15) and having a degree of polymerization of 170 and a degree of saponification of 64% by mol was used as the PVA-based resin of Example 1, and evaluated in the same manner. The results are shown in Tables 2 to 5.

Comparative Example 3

An aqueous emulsion was prepared in the same manner as in Example 1, except that a PVA-based resin obtained in accordance with Example 1, having a content of a side chain 1,2-diol structural unit of 6% by mol, a degree of polymerization of 500, a degree of saponification of 77.6% by mol and a clouding point of 73° C., was used as the PVA-based resin of Example 1, and evaluated in the same manner as in Example 1. The results are shown in Tables 2 to 5.

Comparative Example 4

An aqueous emulsion was prepared in the same manner as in Example 1, except that a PVA-based resin obtained in accordance with Example 1, having a content of a side chain 1,2-diol structural unit of 6% by mol, a degree of polymerization of 500 and a degree of saponification of 95% by mol, was used as the PVA-based resin of Example 1, and evaluated in the same manner. The results are shown in Tables 2 to 5.

In addition, the used PVA-based resins and polymerization methods are described in the following Table 1.

TABLE 1

| | PVA-based resin | | | |
|---|---|---|---|---|
| | Degree of saponification (% by mol) | Degree of polymerization | Content of 1,2-diol structural unit (% by mol) | Polymerization method |
| Example 1 | 89 | 500 | 6 | Pre-emulsion method |
| Example 2 | 89 | 500 | 6 | Pre-emulsion method |
| Example 3 | 89 | 500 | 6 | Pre-emulsion method |
| Example 4 | 92.9 | 500 | 6 | Pre-emulsion method |
| Comparative. Example 1 | 98.6 | 300 | 3 | Dropping polymerization |
| Comparative. Example 2 | 64 | 170 | 4.3[a] | Pre-emulsion method |
| Comparative. Example 3 | 77.6 | 500 | 6 | Pre-emulsion method |
| Comparative. Example 4 | 95 | 500 | 6 | Pre-emulsion method |

[a] content of ethylene oxide group

TABLE 2

| | Average particle size (nm) | Apparent grafting efficiency (%) |
|---|---|---|
| Example 1 | 213 | 70 |
| Example 2 | 151 | 74 |
| Example 3 | 210 | 68 |
| Example 4 | 215 | 68 |
| Comparative Example 1 | 459 | 72 |
| Comparative Example 2 | 300 | 62 |
| Comparative Example 3 | 152000 | — |
| Comparative Example 4 | 285 | 63 |

TABLE 3

| | Tg (° C.) | MFT (° C.) | Tg − MFT (° C.) |
|---|---|---|---|
| Example 1 | 27° C. | 21° C. | 6 |
| Example 2 | 27° C. | 19° C. | 8 |
| Example 3 | 28° C. | 22° C. | 6 |
| Example 4 | 27° C. | 22° C. | 5 |
| Comparative Example 1 | 27° C. | 26° C. | 1 |
| Comparative Example 2 | 25° C. | 21° C. | 4 |
| Comparative Example 3 | — | — | 0 |
| Comparative Example 4 | 27° C. | 24° C. | 3 |

TABLE 4

| | Chemical stability | Freezing stability | Adhesive strength (wood destruction ratio) (%) |
|---|---|---|---|
| Example 1 | A | A | 40 |
| Example 2 | A | A | 50 |
| Example 3 | A | A | 80 |
| Example 4 | A | A | — |
| Comparative Example 1 | A | A | 20 |
| Comparative Example 2 | B | B | — |
| Comparative Example 3 | A | A | 0 |
| Comparative Example 4 | A | B | — |

TABLE 5

| | Film transparency (haze value) | Water whitening resistance (haze value) | |
|---|---|---|---|
| | | Before crosslinking | After crosslinking |
| Example 1 | 0.10 | 9.79 | 1.00 |
| Example 2 | 0.02 | 5.72 | 0.37 |
| Example 3 | 0.09 | — | — |
| Example 4 | 0.02 | 4.76 | 0.70 |
| Comparative Example 1 | 0.26 | 12.23 | 4.87 |
| Comparative Example 2 | 0.14 | — | — |
| Comparative Example 3 | 2.77 | — | — |
| Comparative Example 4 | 0.02 | 11.15 | 1.86 |

As is evident from these results, the aqueous emulsion of the invention has a large difference between Tg and MFT (minimum film-forming temperature), so that it is excellent in film-forming property, excellent in chemical stability and freezing stability and also excellent in adhesive strength with wood. In addition, the dry film obtained from the aqueous emulsion of the invention has high transparency and is also excellent in water whitening resistance, and the water whitening resistance is further improved when a crosslinking agent is used further concomitantly.

While the invention has been described in detail and with reference to specific embodiments thereof, it will be apparent to one skilled in the art that various changes and modifications can be made therein without departing from the spirit and scope of the invention.

This application is based on a Japanese patent application filed on Nov. 28, 2007 (Japanese Patent Application No. 2007-306689), the entire contents thereof being thereby incorporated by reference.

INDUSTRIAL APPLICABILITY

Since the aqueous emulsion of the invention can form a film having excellent transparency and is excellent in mechanical stability, chemical stability, freezing stability and storage stability, it is markedly suitable for applications such as adhesives and coating agents.

The invention claimed is:

1. An aqueous emulsion, comprising a dispersant comprising a polyvinyl alcohol-based resin and a polymer comprising, as a dispersoid, a structural unit derived from an ethylenically unsaturated monomer, wherein an average particle size of the dispersoid is from 100 to 450 nm and an apparent grafting efficiency of the polyvinyl alcohol-based resin based on the dispersoid is from 65 to 75%, which is obtained by adding a pre-emulsion dropwise to an aqueous medium to carry out emulsion polymerization, wherein the pre-emulsion is obtained by emulsifying and dispersing the ethylenically unsaturated monomer in water in the presence of the polyvinyl alcohol-based resin which comprises a 1,2-diol structural unit represented by the following formula (1) and has a degree of saponification of from 80 to 93% by mol:

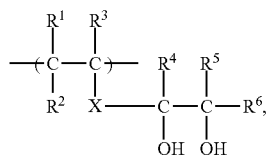

(1)

wherein in the formula, $R^1$, $R^2$, and $R^3$ each independently represents a hydrogen atom, X represents a single bond or a bonding chain, and $R^4$, $R^5$, and $R^6$ each independently represents a hydrogen atom.

2. The aqueous emulsion according to claim 1, wherein the ethylenically unsaturated monomer is an acrylic-based monomer.

3. The aqueous emulsion according to claim 1, wherein a content of polyvinyl alcohol-based resin comprising a 1,2-diol structural unit represented by the formula (1) in the polyvinyl alcohol-based resin is from 2 to 15% by mol.

4. The aqueous emulsion according to claim 1, wherein an average degree of polymerization of the polyvinyl alcohol-based resin comprising the 1,2-diol structural unit represented by the formula (1) is from 50 to 4,000.

5. The aqueous emulsion according to claim 1, wherein the 1,2-diol structural unit represented by the formula (1) is a 1,2-diol structural unit represented by the following formula (1'):

[Chem. 2]

(1')

6. The aqueous emulsion according to claim 1, wherein a content of the dispersant is from 0.1 to 100 parts by weight based on 100 parts by weight of the dispersoid.

7. The aqueous emulsion according to claim 1, which has a solid matter concentration of from 10 to 60% by weight.

8. The aqueous emulsion according to claim 1, which comprises a crosslinking agent.

9. The aqueous emulsion according to claim 8, wherein the cross-linking agent is methylolmelamine.

10. The aqueous emulsion according to claim 8, wherein a content of the cross-linking agent is from 0.1 to 150 parts by weight based on 100 parts by weight of the polyvinyl alcohol-based resin.

11. A method for producing an aqueous emulsion, which comprises: obtaining a pre-emulsion by emulsifying and dispersing an ethylenically unsaturated monomer in water in the presence of a polyvinyl alcohol-based resin comprising a 1,2-diol structural unit represented by the formula (1) and having a degree of saponification of from 80 to 93% by mol; and adding the obtained pre-emulsion dropwise to an aqueous medium to carry out emulsion polymerization, wherein formula (1) is:

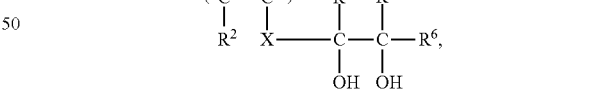

(1)

wherein in the formula, $R^1$, $R^2$, and $R^3$ each independently represents a hydrogen atom, X represents a single bond or a bonding chain, and $R^4$, $R^5$, and $R^6$ each independently represents a hydrogen atom.

* * * * *